United States Patent
Sato et al.

(10) Patent No.: US 7,724,910 B2
(45) Date of Patent: May 25, 2010

(54) ATMOSPHERE CONTROL DEVICE

(75) Inventors: Nobuo Sato, Saitama (JP); Yasunari Obuchi, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 11/918,042

(22) PCT Filed: Apr. 13, 2005

(86) PCT No.: PCT/JP2005/007141
§ 371 (c)(1),
(2), (4) Date: Oct. 9, 2007

(87) PCT Pub. No.: WO2006/112009
PCT Pub. Date: Oct. 26, 2006

(65) Prior Publication Data
US 2009/0067646 A1    Mar. 12, 2009

(51) Int. Cl.
*H03G 3/20* (2006.01)
(52) U.S. Cl. ................................ 381/110
(58) Field of Classification Search ............ None
See application file for complete search history.

(56) References Cited
U.S. PATENT DOCUMENTS 5,027,687 A * 7/1991 Iwamatsu ............... 84/600
5,261,005 A * 11/1993 Masayuki ............... 381/18
5,296,643 A * 3/1994 Kuo et al. ............. 434/307 A
5,542,000 A 7/1996 Semba
2005/0264425 A1 12/2005 Sato et al.

FOREIGN PATENT DOCUMENTS

| JP | 6-274188 | 3/1993 |
| JP | 08-124406 | 10/1994 |
| JP | 09-166992 | 12/1995 |
| JP | 2004-163767 | 11/2002 |
| JP | 2005-346254 | 6/2004 |

OTHER PUBLICATIONS

International Search Report of PCT/JP2005/007141 mailed May 24, 2005.

\* cited by examiner

*Primary Examiner*—Andre J Allen
(74) *Attorney, Agent, or Firm*—Stites & Harbison PLLC; Juan Carlos A. Marquez, Esq.

(57) ABSTRACT

The present invention provides elimination of atmosphere that is not suitable to a space concerned by controlling atmosphere.

The present invention is characterized that atmosphere in space is analyzed based on voice, and if atmosphere that is not suitable to the space is detected, the atmosphere in the space is controlled by choosing and irradiating illumination that enables to create atmosphere suitable to the space, atmosphere in the space is controlled for creating atmosphere that is suitable to the space.

10 Claims, 18 Drawing Sheets

FIG.3

| NUMBER | DETECTING TIME | RESULT | | COUNT | | | | | | | | ILLUMI-NATION | LUMINOUS INTENSITY OF ILLUMINATION | ELAPSED TIME |
| --- | --- | --- | --- | --- | --- | --- | --- | --- | --- | --- | --- | --- | --- | --- |
| | | ACTIVE | PLEASANT | 1 | 2 | 3 | 4 | 5 | 6 | 7 | 8 | | | |
| 1 | 2004/8/8 09:56:03 | 5.5 | 4.5 | 0 | 0 | 1 | 0 | 0 | 0 | 0 | 0 | NORMAL | | |
| 2 | 2004/8/8 09:57:28 | 5.2 | 5.2 | 0 | 0 | 2 | 0 | 0 | 0 | 0 | 0 | NORMAL | | |
| 3 | 2004/8/8 09:58:14 | 4.9 | 5.2 | 0 | 0 | 3 | 0 | 0 | 0 | 0 | 0 | NORMAL | | |
| 4 | 2004/8/8 09:59:14 | 6.1 | 6.1 | 0 | 0 | 4 | 1 | 0 | 0 | 0 | 0 | 3 | WEEK | 00 MIN. 00 SECOND |
| 5 | 2004/8/8 10:00:32 | 5.1 | 6.1 | 0 | 0 | 1 | 0 | 0 | 0 | 0 | 0 | 3 | MIDDLE | 01 MIN. 18 SECOND |

301  302  303  304  305  306  307

| | ITEM | VALUE 1 | VALUE 2 | VALUE 3 | VALUE 4 | VALUE 5 |
|---|---|---|---|---|---|---|
| 507 | ACTIVE - NON-ACTIVE | 9.2 | 5.3 | -9.1 | 10.1 | 3.2 |
| 508 | PLEASANT - UNPLEASANT | -2.3 | 23.1 | -9.1 | -98.1 | 1.2 |

FIG.6

| | ATTRIBUTE 601 | VALUE 602 |
|---|---|---|
| 603 | TARGET AREA (AVTIVE – NON-ACTIVE) | 2.0~4.0 |
| 604 | TARGET AREA (PLEASANT – UNPLEASANT) | 1.0~4.0 |
| 605 | NUMBER OF TIMES FOR DETERMINING ATMOSPHERE | MORE THAN FOUR TIMES PER SIX MIN. |
| 606 | NUMBER OF TIMES FOR CHANGING LUMINOUS INTENSITY | MORE THAN ONE TIME PER TWO MIN. |

| DIRECTION | RED | ORANGE | BLUE | YELLOW | PURPLE | PINK | GREEN | BROWN |
|---|---|---|---|---|---|---|---|---|
| 1 | 1 | 2 | 3 | 4 | 5 | 6 | 7 | 8 |
| 2 | 8 | 1 | 2 | 3 | 4 | 5 | 6 | 7 |
| 3 | 7 | 8 | 1 | 2 | 3 | 4 | 5 | 6 |
| 4 | 6 | 7 | 8 | 1 | 2 | 3 | 4 | 5 |
| 5 | 5 | 6 | 7 | 8 | 1 | 2 | 3 | 4 |
| 6 | 4 | 5 | 6 | 7 | 8 | 1 | 2 | 3 |
| 7 | 3 | 4 | 5 | 6 | 7 | 8 | 1 | 2 |
| 8 | 2 | 3 | 4 | 5 | 6 | 7 | 8 | 1 |

FIG.11

| DIRECTION | RED | ORANGE | BLUE | YELLOW | PURPLE | PINK | GREEN | BROWN |
|---|---|---|---|---|---|---|---|---|
| 1 | 5 | 0 | 2 | 2 | 1 | 3 | 4 | 3 |
| 2 | 0 | 4 | 0 | 2 | 2 | 1 | 3 | 2 |
| 3 | 0 | 0 | 5 | 0 | 2 | 2 | 1 | 3 |
| 4 | 2 | 2 | 1 | 8 | 2 | 2 | 1 | 3 |
| 5 | 1 | 2 | 2 | 1 | 7 | 0 | 0 | 0 |
| 6 | 0 | 0 | 2 | 2 | 1 | 6 | 2 | 1 |
| 7 | 2 | 2 | 1 | 2 | 2 | 1 | 3 | 1 |
| 8 | 2 | 1 | 0 | 0 | 2 | 1 | 2 | 8 |

| NUMBER | DETECTING TIME | RESULT | | COUNT | | | | | | | | ILLUMI-NATION | DISTANCE | | ELAPSED TIME |
|---|---|---|---|---|---|---|---|---|---|---|---|---|---|---|---|
| | 1302 | ACTIVE | PLEASANT | 1 | 2 | 3 | 4 | 5 | 6 | 7 | 8 | | ACTIVE | PLEASANT | |
| 1 | 2004/8/8 09:56:03 | 5.5 | 4.5 | 0 | 0 | 1 | 0 | 0 | 0 | 0 | 0 | NORMAL | – | – | |
| 2 | 2004/8/8 09:57:28 | 5.2 | 5.2 | 0 | 0 | 2 | 0 | 0 | 0 | 0 | 0 | NORMAL | – | – | |
| 3 | 2004/8/8 09:58:14 | 4.9 | 5.2 | 0 | 0 | 3 | 0 | 0 | 0 | 0 | 0 | NORMAL | – | – | |
| 4 | 2004/8/8 09:59:14 | 6.1 | 6.1 | 0 | 0 | 4 | 0 | 0 | 0 | 0 | 0 | 3 | 4.5 | 3.2 | 00 MIN. 00 SECOND |
| 5 | 2004/8/8 10:00:32 | 5.1 | 6.1 | 0 | 0 | 1 | 0 | 0 | 0 | 0 | 0 | 3 | | | 01 MIN. 18 SECOND |

FIG.14

| ATTRIBUTE | VALUE |
|---|---|
| ILLUMINATION FOR RAISING ACTIVITY | RED |
| ILLUMINATION FOR RAISING NON-ACTIVITY | BLUE |
| ILLUMINATION FOR RAISING PLEASANT | ORANGE |
| ILLUMINATION FOR RAISING UNPLEASANT | PURPLE |
| TARGET AREA (ACTIVITY − NON-ACTIVITY) | 2.0~4.0 |
| TARGET AREA (PLEASANT − UNPLEASANT) | 1.0~4.0 |
| NUMBER OF TIMES FOR DETERMINING ATMOSPHERE | MORE THAN FOUR TIMES PER SIX MIN. |
| INDEX (ACTIVITY − NON-ACTIVITY) | 1.0 |
| INDEX (PLEASANT − UNPLEASANT) | 0.8 |

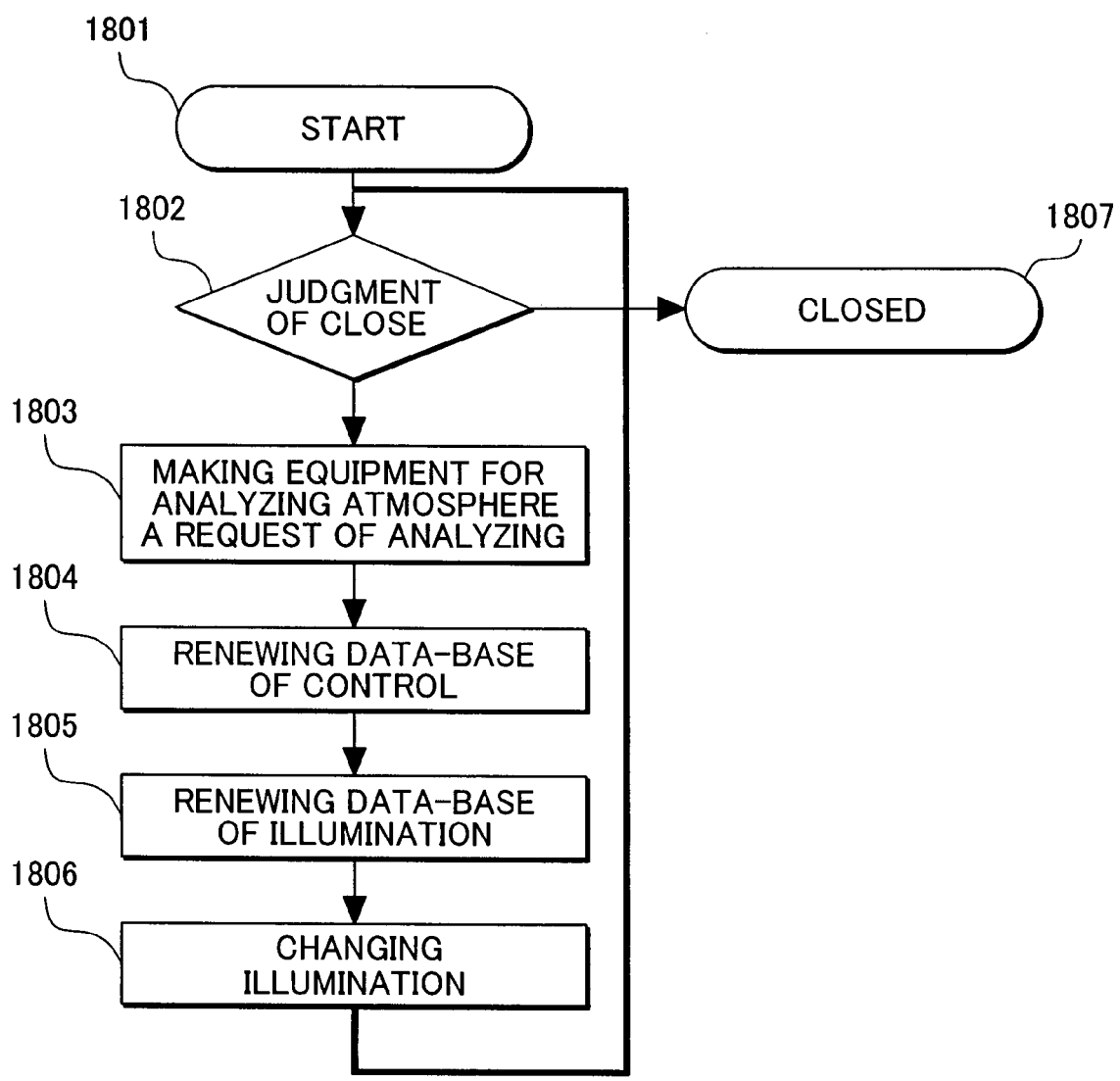

FIG.19

| EQUIPMENT FOR ANALYZING ATMOSPHERE ID (1901) | SITE (1902) | PRESENT CONDITIONS (1903) | ILLUMI-NATION (1904) | LUMINOUS INTENSITY OF ILLUMI-NATION (1905) | JUDGING TIME (1906) |
|---|---|---|---|---|---|
| 1 | NEIGHBO-RHOOD OF ENTRANCE | ACTION | 3 | MIDDLE | 2004/8/8 10:07:14 |
| 2 | BY THE WINDOW 1 | ACTION | NORMAL | – | 2004/8/8 10:02:10 |
| 3 | BY THE WINDOW 2 | STOP | – | – | – |
| 4 | CENTER 1 | ACTION | NORMAL | – | 2004/8/8 10:02:15 |
| 5 | CENTER 2 | STOP | – | – | – |

FIG.20

| ILLUMINATION ID (2001) | EQUIPMENT FOR ANALYZING ATMOSPHERE ID (2002) | ILLUMI-NATION (2003) | LUMINOUS INTENSITY OF ILLUMI-NATION (2004) | JUDGING TIME (2005) | ELAPSED TIME (2006) |
|---|---|---|---|---|---|
| 1 | 1 | 3 | MIDDLE | 2004/8/8 10:07:14 | 00:10 SECOND |
| 2 | 1 | 3 | MIDDLE | 2004/8/8 10:07:14 | 00:10 SECOND |
| 3 | NORMAL | NORMAL | | – | – |

ATMOSPHERE CONTROL DEVICE

TECHNICAL FIELD

The present invention relates to atmosphere control which enables control of atmosphere, by analyzing atmosphere of a space, and if atmosphere that is not suitable to the space, by radiating illumination that can create suitable atmosphere.

BACKGROUND ART

Five senses (eyesight, smell, touch, taste and hearing) can make a direct appeal to our sensitivity. As a technology that utilizes this fact, there is a method that enables to intentionally create atmosphere by controlling illumination.

A technology intending to control illumination in synchronization with music has been known, wherein, by picking the melody tune out of the music and then irradiating illumination that is suitable to the music (See Patent Reference 1, for example). However, the technology only creates atmosphere of the music and it does not create atmosphere of the space by detecting atmosphere that is given off by a person who is present in the space.

Further, there is a technology that, when downloading Karaoke information through Karaoke on demand from a server, it enables presentment suitable for the music by adding a control command of illumination in addition to music and video (See Patent Reference 2, for example). However, since the control command of illumination synchronizes with the music, it is not possible to detect the state of mind of a person who is singing Karaoke and control illumination by considering his or her state of mind.

Furthermore, there is a technology that, by mounting a sensor on the microphone, irradiates a person who holds the microphone with spot light (See Patent Reference 3, for example). However, since this technology is arranged to irradiate the spotlight to a person who is designated in advance, it is able to follow movements of a person, but it cannot deal with atmosphere of a space.

Patent Reference 1: JP-A-2004-163767

Patent Reference 2: JP-A-6-274188

Patent Reference 3: JP-A-8-124406

DISCLOSURE OF THE INVENTION

Problem to be Solved by the Invention

When restless atmosphere arises in a space where many people get together, it is difficult to bring the disturbance under control. So far, a person urged people making noise to take precautions and brought the disturbance under control. However, in recent years, the environment is such that a person who received a caution causes injury to a person who gave the caution, for example, and it is difficult to give cautions to others. In particular, in a space such as a public space where there are many third persons, it is considerably difficult to urge a stranger to take precautions.

In a space such as public space, atmosphere that is suitable to the space exists. Accordingly, when the space is turned to be unsuitable atmosphere, atmosphere control is required to automatically turn it back to the suitable atmosphere.

A problem to be solved by the invention is, in space, to automatically control atmosphere to the atmosphere that is suitable to the space.

Means for Solving the Problem

The general description of the typical invention to be disclosed in the present application to solve the problem stated above is as follows. The atmosphere control device according to the present invention includes an atmosphere analysis program which detects atmosphere from the sound that is input through a microphone, a recording part recording the atmosphere control program which is a program to control atmosphere in space from the atmosphere detected, an operation input part for conducting inputting operations such as those of the atmosphere control device from an external source, a voice input part for taking in a sound signal to analyze atmosphere, an illumination part for outputting the atmosphere that is created by illumination, and a control part which controls the above-stated parts.

The atmosphere control device analyzes present atmosphere by taking in sound via the voice input part and by analyzing the sound. Then, when it judges the atmosphere is not suitable for a certain space, it selects illumination that can create a suitable atmosphere and irradiate the illumination.

Further, with the invention in the present application, to deal with large space, functions of the above-stated atmosphere control device are divided into two devices: a device for analyzing atmosphere which is a device to store the atmosphere analysis program that detects atmosphere from a sound that is input through a microphone; and a device for changing atmosphere control which is a device to store the atmosphere control program that controls spatial atmosphere from the atmosphere detected. Then, by connecting the device for analyzing atmosphere and the atmosphere control/change device to a network, it becomes possible to control a plurality of devices for analyzing atmosphere and the atmosphere control/change device in a lump sum, thus enabling control of atmosphere even in larger space.

Effects of the Invention

Since the atmosphere control device can automatically analyze atmosphere of the space, it can automatically control the atmosphere only when it detects atmosphere that is not suitable to the space. In addition, since provision of illumination makes it possible to make an appeal directly to our sensitivity, it becomes possible to control the person in question who is creating unsuitable atmosphere without making him or her to aware of it.

Further, since the atmosphere control device according to the present invention can flexibly control atmosphere, it is also possible to voluntarily create atmosphere intended by a shop manager of a restaurant, for example, creation of atmosphere in restaurants such as a bar. For example, since the atmosphere control device can create a grooving atmosphere when the atmosphere is loosing stream, and calm down the atmosphere when it is too pumped up and is messing around, it is possible to keep the atmosphere suitable for the shop at a certain level, as a result.

Furthermore, since the atmosphere control device according to the present invention can control a plurality of microphones and illumination devices in a lump sum, it is possible to use it for monitoring space, such as detection of a riot.

BEST MODE FOR CARRYING OUT THE INVENTION

Hereinafter, preferred embodiments of the present invention will be described with reference to the accompanying drawings. FIG. 1 is a system configuration diagram for realizing the atmosphere control device of the present invention. The reference number 100 shows a device for changing atmosphere control. The device for changing atmosphere control 100 includes a control part 101 which has various data processing functions, a recording part 102 which can store various types of data such as a hard disk or memory device, an operation input part 103 which enables inputting signals from a keyboard, a mouse, a touch panel, a remote control unit, etc., an output part 104 which includes a liquid crystal display, a loudspeaker, etc. and enables display of various types of data, audio output, etc., a voice input part 105 which includes a microphone for inputting a voice signal, and an illumination part which includes illumination to be used for controlling atmosphere. In addition, in the recording part 102, the main program for executing various kinds of processing in the device for changing atmosphere control 100 and other data are recorded, wherein the main program is read by the control part 101 for execution of various kinds of processing. A voice signal is taken in and analyzed by the voice input part 105 for judgment if the atmosphere is suitable for the space. If the atmosphere is judged to be not suitable, illumination that will create suitable atmosphere is irradiated via the illumination part 106.

Next, drawings that are employed for explaining the present invention will be described.

FIG. 1 is a system configuration diagram for realizing the atmosphere control device of the present invention.

FIG. 2 illustrates processes and the flow chart of the atmosphere control device used in the first embodiment.

FIG. 3 illustrates a database showing the present status of the atmosphere control device used in the first embodiment.

FIG. 4 illustrates the atmosphere analysis processing and the flow chart.

FIG. 5 illustrates a database in which reference atmosphere used in atmosphere analysis processing is stored.

FIG. 6 illustrates a database concerning atmosphere illumination.

FIG. 7 is a diagram illustrating relationship between atmosphere and illumination.

FIG. 8 is a diagram showing directions to create suitable atmosphere.

FIG. 9 illustrates processes and the flow chart to decide illumination colors.

FIG. 10 illustrates a database showing priority of colors to be used for illumination.

FIG. 11 illustrates a database showing if creation of suitable atmosphere has been made successfully or not according to colors.

FIG. 12 is a diagram illustrating a window for changing atmosphere.

FIG. 13 illustrates a database (No. 2) showing the present status of the atmosphere control device to be used in the first embodiment.

FIG. 14 illustrates a database (No. 2) concerning atmosphere illumination.

FIG. 15 is a diagram (No. 2) showing relationship between atmosphere and illumination.

FIG. 16 is a system configuration diagram for realizing an atmosphere control device for the case the device for analyzing atmosphere and the device for changing atmosphere control to be used in the second embodiment are used.

FIG. 17 is a configuration diagram for the case a plurality of devices for analyzing atmosphere and a device for changing atmosphere control that are used in the second embodiment are used.

FIG. 18 illustrates processes and a flow chart thereof of a device for changing atmosphere control that is used in the second embodiment.

FIG. 19 illustrates a database showing the present status of a device for analyzing atmosphere that is used for processes in the device for changing atmosphere control used in the second embodiment.

FIG. 20 illustrates a database showing the present status of illumination used for processes in the device for changing atmosphere control used in the second embodiment.

FIG. 21 illustrates processes and a flow chart thereof of a device for analyzing atmosphere used in the second embodiment.

With the present invention, atmosphere is detected by the control part 101 by using a sound signal that is input through the voice input part 105. Sound signals are detected for every speech and are lined up on the time-series plot for final determination of atmosphere. With such arrangement, a person concerned can hardly be aware that atmosphere is under control.

First Embodiment

Hereinafter, the first embodiment which uses the system configuration shown in FIG. 1 will be described by referring to FIG. 2. For the first embodiment, an atmosphere control device placed in small space will be described. More specifically, the atmosphere control device refers to a control device which includes one each of microphone to take in sounds and illumination control to change illumination.

FIG. 2 illustrates processes that are executed in the atmosphere control device 100. The atmosphere control device 100 takes in sounds through the voice input part 105, executes atmosphere analysis through the control part 101 based on the sounds thus taken in. If the atmosphere control device 100 judges the atmosphere is not suitable, it selects illumination that can create suitable atmosphere and irradiate the illumination through the illumination part 106. It is preferable that the atmosphere control device can realize the above-stated processes. For example, the process shown in FIG. 2 is an example, and a flow chart of another atmosphere control device that is in adherence with the purpose of the present invention may be used.

Start 201 implies the staring point of atmosphere control processes. Steps from Judgment of Close 202 to Changing Illumination 207 are repeated until it is judged closed in the judgment of close 202. In judgment of close 202, judgment is made whether the atmosphere control processes are closed or not by checking whether an order for close that is delivered from the input part 103 or not. When atmosphere control processes are continued, the process advances to Taking In 203, and when it they are closed, the process advances to Close 208. In Taking In 203, processing is executed to cut off voice that is input by the voice input part 105 for a certain period of time. In Analyzing Atmosphere 204, by analyzing voice that is cut off in Taking In 203, atmosphere in the current space is analyzed. Details of such processing will be described by referring to the Atmosphere Analysis Flow Chart in FIG. 4. In Determining Illumination 205, based on the result of Analyzing Atmosphere 204 and the result of past atmosphere analyses, illumination required for presently-desired atmosphere is determined. Details of such processing will be described by referring to the Illumination Determination Flow Chart in FIG. 8. In Renewing Present Database 206, the result of Analyzing Atmosphere 204 and the result of Determining Illumination 205 are described in a present-status database (FIG. 3). By storing atmosphere thus detected in time series, it becomes possible consider not only present results, but also past results. In Changing Illumination 207, if a change request is made to the result of Renewing Present Database 206 and atmosphere of the present space, a change illumination command is issued to the illumination part 106 to change the present illumination to the one that create new atmosphere. Then, illumination is irradiated to the space by the illumination part 106.

In the illumination part 106, for example, many LEDs are connected according to colors, and an LED which is adequate to a color is illuminated. In addition, to indicate levels such as color density and light intensity, such levels can preferably be changed accordingly, for example, for indicating a weak level, two LEDs of appropriate color are used, for a middle level, five LEDs, and for a high level, ten LEDs. Further, if an LED is capable of developing many colors, it is preferable that the LED can be controlled by using the light's three primary colors (including color's three primary colors) or RGB values. An RGB value of each color and an RGB value of levels that represents levels such as color density and light intensity are determined in advance, a database of such values is made, and they are stored in the recording part 102. Then, an RGB value that satisfies the command is chosen, and the chosen value may be used for irradiating illumination. Further, with the present method, it is possible to utilize a mechanism, if it is designed to enable change illumination color, and, for example, a normal illumination and a colored cellophane sheet or the like may be used. Then, in the illumination part 106, the present illumination is replaced based on the illumination change command. Furthermore, when changing illumination, it is preferable that the person concerned will hardly aware of the change, an example of which is to change illumination gradually and by taking time. Closed 208 shows the end of the flow chart of the atmosphere control device.

It is preferable that the result of processing executed by the atmosphere control device 100. should be stored in the recording part 102, and the result may be compiled in a database. For example, FIG. 3 shows an example, and another present status database that is in adherence with the spirit of the present invention may be used.

The reference number 301 is an independent number for each data detected. The purpose of using the number is to make control of detected data easier by assigning the number in this way. Further, it is preferable to assign smaller numbers in the order of earlier time of atmosphere detection. Detecting Time 302 is time when atmosphere is detected. Result 303 is an analysis result obtained through the Analyzing Atmosphere 204. Processing result of Analyzing Atmosphere 204 is described for each axis. Count 304 shows a table which illustrates to which the Result 303 belongs in the atmosphere space. To the Result 303, the value is increased by 1 for an adequate item in the Count 304. Illumination 305 shows a value that is output by the Determining Illumination 205 in the atmosphere control device flow chart in FIG. 2. Based on the value, illumination in adequate color will be irradiated. Factors to be substituted for the Illumination 305 include numeric numbers 1 to 8 showing respective atmospheres that constitute items of the Count 304, and include "normal" showing other atmosphere. Luminous Intensity of Illumination 306 shows light intensity of illumination that is required to create atmosphere. When no atmospheric change is acknowledged even if illumination has been changed, creation of atmosphere will be encouraged by increasing light intensity of illumination. Values to be substituted for the Luminous Intensity of Illumination 306 include strong, middle and weak levels. It will be arranged that, as the value increases, the luminous intensity will also increase. Elapsed Time 307 shows description of time elapsed since the illumination was changed. Finally, description was made in the above concerning items of the present status database (FIG. 3). Although the number of items in the Count 304 is 8 concerning the present status database, it is preferable that the number of items of the database should be increased or reduced by modifying the number of items. Further, it is preferable that, after a certain time has elapsed, items should be erased in the order of earlier Detection Time 302.

In the "analyzing atmosphere" 204 of the atmosphere control device flow chart (FIG. 2), it is preferable that atmosphere should be identified based on voice. For example, FIG. 4 shows an example of an atmosphere analysis flow chart illustrating processing to analyze atmosphere in the present space. This is processing that observes status of the present space, thereby analyzing atmosphere in the space, regarding if the space is noisy or deadly silent.

FIG. 4 shows a flow chart illustrating a typical configuration example of an atmosphere analysis flow chart, and the atmosphere analysis flow chart includes equipment for abstracting sound characteristic 402 and a process for discriminating atmosphere 403 and executes atmosphere discrimination by using a database of atmosphere. The equipment for abstracting sound characteristic 402 abstracts characteristic amount based on voice inputted. Measures for calculating the pitch of voice (fundamental frequency) which is an element of the characteristic amount include: (1) calculating power spectrum through Fourier transformation; (2) executing auto-correlation function of the power spectrum; (3) calculating the peak value of the auto-correlation function; and (4) calculating cycle of the peak and then calculating the reciprocal number of the cycle. By doing this, it becomes possible to calculate pitch of voice (fundamental frequency) based on sound. Measures for calculating the fundamental frequency are not limited to the above, and it is possible to use known methods. As for characteristic, characteristic for detecting atmosphere will be detected not only from pitch of voice, but also from other factors such as interval between voices, long tone, laughing voice, intensity of voice, velocity of voice, and so on, which are then defined as characteristic amount for identifying the atmosphere. These factors are only examples, and it is also possible, based on analysis result of sound, to determine it as the characteristic amount. Further, to the characteristic amount referred to earlier, changes in time may be added as characteristic amount. Furthermore, for the characteristic amount, characteristic of known atmosphere may also be used.

The process for discriminating atmosphere 403 analyzes atmosphere based on sound characteristic abstracted from the equipment for abstracting sound characteristic 402. In the process for discriminating atmosphere 403, by using discrimination analysis, first executes learning and calculates a factor of discrimination function based on the characteristic amount of voice data that is specified in advance. As a result, an equation for discrimination factor will be $Z=a_1X_1+a_2X_2+a_3X_3+a_4X_4+a_5X_5$ as derived from five factors $a_1, a_2 \ldots a_5$ which are used in the learning, when five characteristics are assumed to be $X_1, X_2, \ldots X_5$. For example, it is preferable to calculate a factor of discrimination function that the result $Z$ of discrimination function becomes 10 for activity and −10 for non-activity. Then, by using the discrimination function, voice data that is not specified will be discriminated. The result will be active if the figure is positive or non-active if the figure is negative. Further, when extracting the level of atmosphere, it can be discriminated that a large positive figure shows high activity level, or a large negative figure shows high non-activity level. The method is an example for identifying atmosphere and any known methods can be used. For example, methods such as a neural network or the multivariate analysis technique may be used. Furthermore, for executing the process for discriminating atmosphere 403, the database of atmosphere (FIG. 5) is used.

The database of atmosphere (FIG. 5) is a database of results that are obtained through the learning described earlier. By using the database, the learning can be omitted. In addition, the database stores a plurality of factors for identifying various types of atmosphere, and is further a database in which a plurality of data is recorded in association with parameters of the data. As for inputted voice, it becomes possible to identify atmosphere of the sound that is currently inputted, by comparing the voice with the database of atmosphere (FIG. 5).

FIG. 5 shows an example of a database of atmosphere. The reference number 501 denotes the name of atmosphere, and the reference numbers 502 through 506 denote factors to respective items. The reference number 507 denotes active and non-active atmospheres, and the reference number 508 denotes pleasant and unpleasant atmospheres. It should be noted that items to be described in these databases of atmosphere shall not be limited to those herein stated, and they may be deleted or added as required. Further, atmosphere may be analyzed by using voice recognition technique. In this case, it can also be determined that a certain atmosphere is detected if a certain word is recognized. Furthermore, means other than voice may be used, and atmosphere of people may be measured by using a camera.

For creating atmosphere, it is preferable that illumination should be utilized. For example, in this case, it is necessary that illuminations which can create atmosphere in the present space and atmosphere suitable to the space should be specified in advance, and a database of illumination of atmosphere shown in FIG. 6, wherein the illuminations are compiled, may be used. In this database, information that is required for creating atmosphere such as judgment criteria of illumination and intensity of illumination are stated. An attribute 601 is a description of an item that exists in the database. In a value 602, a value for each item of the attribute 601 is described. Target areas 603 and 604 show converted values of atmosphere that is suitable for the space. The values are calculated by Analyzing Atmosphere 204 by using voice data that is judged to be suitable in the space. In number of times for determining atmosphere 605, items that should be the base for determining the present atmosphere, which are criteria for determining atmosphere, are described. Based on the result, atmosphere that should be created is determined. In number of times for changing luminous intensity 606, a value of judgment criteria for changing luminous intensity of illumination is described. Finally, it is preferable that customization should be enabled by rewriting the database of illumination of atmosphere (FIG. 6).

FIG. 7 is a schematic diagram illustrating relationship between atmosphere and illumination. FIG. 7 shows atmospheres of activeness 703 and non-activeness 704, and pleasantness 705 and unpleasantness 706 in two-dimensional graphs. In FIG. 7, a graph shows activeness 703 and non-active 704, and another graph shows pleasant 705 and unpleasant 706 atmospheres. Defining such atmosphere space and mapping it in a two-dimensional graph has been known in general. Refer to "Core affect and the psychological construction of emotion", Russell J. A., Psychological Review, p. 110 and pp. 145-172. An area of atmosphere suitable in a space is expressed as target area 707, which illustrates the target areas 603 and 604 in the database of illumination of atmosphere (FIG. 6). At the center of the target area 707, the increasing and the decreasing areas are divided into eight areas, which are illustrated as Areas 1 to 8 (708 to 7015). These areas coincide with the number of items in the area 304 of the present status database (FIG. 3). The number of divisions can be determined at random, and in FIG. 7, for example, the area is divided into eight areas.

Further, FIG. 8 shows an example which illustrates suitable directions for shifting areas 1 to 8 (708 to 7015) shown in FIG. 7 to areas of the target area 707 which shows areas of suitable atmosphere in the space. FIG. 8 shows the same space as shown in FIG. 7 and the target area is 801. Directions 1 to 8 (802 to 809) show required atmosphere that should be created for allowing shifting atmospheres judged to be the areas 1 to 8 (708 to 7015) shown in FIG. 7 to atmospheres in the target area 801. In FIG. 8, areas are directly connected with arrow lines each other. However, this is only an example, and the areas may be connected via other areas without being connected directly.

FIG. 9 shows, by using a determination flow chart, an example of processes for determining a suitable color for irradiating illumination. Step measurement 902 is a process to measure the present atmosphere. According to a value that is calculated in the "analyzing atmosphere" 204, either one of the areas 1 to 8 (708 to 7015) in FIG. 7 that shows relationship between atmosphere and illumination is chosen. In the case of the target area 703, no choice is made. Then, a numerical number is increased by 1 for the item having the number that is chosen in "count" 304 in the present status database (FIG. 3).

Step "color identification" 903 is a process to determine a present color to be irradiated according to atmosphere. With the process, the present atmosphere is determined, and if the atmosphere is not suitable, a process to identify a color which creates suitable atmosphere is carried out. The method for choosing a color identifies the present atmosphere. Actually, determination is made based on the result of counts through atmosphere analysis of a speech calculated earlier. More specifically, determination is made based on respective values of the Count 304. As for the determination method, a numerical figure of the item and the number of times for determining atmosphere 605 in the database of illumination of atmosphere (FIG. 6) are compared, and if the value of the Count 304 exceeds the comparison result, the item should be the result. Then, a color is identified by using the numerical figure chosen, database of illumination priority and the database of the number of success times (FIG. 11). As for an identifying method, the numerical figure chosen initially and the database of the number of success times (FIG. 11) are checked, and then a color having the largest numerical figure among the adequate numerical figures is chosen. When the largest numerical figure does not exist and a plurality of items having large numbers exist, a color having high priority in a database of illumination priority (FIG. 10) is chosen. Further, if the luminous intensity is judged to be low, middle or high in the Luminous Intensity of Illumination 306, the luminous intensity is changed to low, idle or high, respectively.

Step "learning" 904 is a process to check if the color obtained in the "color identification" 903 actually made a difference when atmosphere conversion is carried out. Causes for not making a difference include: (1) luminous intensity of illumination is low; and (2) an adequate color has not been irradiated. To deal with such problems, for the case of (1), illumination having stronger creative power is chosen. Next, a method for choosing illumination will be described. Since it is assumed that atmosphere will not change rapidly, determination is made based on the result of counts of atmosphere analysis during a speech in a certain period of time. More specifically, determination is made based on respective values of the "count" 304. As for the determination method, a numerical figure of the item and the number of times for changing luminous intensity 606 in the database of illumination of atmosphere (FIG. 6) are compared, and if the value of the "count" 304 exceeds the comparison result, the item should be the result. Then, luminous intensity is changed to middle if the intensity is weak, or to high if it is middle. In the case of (2) above, by obtaining counts in advance for the case where suitable atmosphere is successfully created, an adequate color will be chosen. One example of this is to choose an adequate color by executing processes for renewing the database of the number of success times (FIG. 11). Analysis is conducted by using the same method as that described in (1) above, and the data to be used for comparison is the number of times for determining atmosphere 605. In addition, when creation of suitable atmosphere is successfully carried out, the database of success times (FIG. 11) is renewed, and the FIG. 1 is added to the appropriate item.

FIG. 10 shows colors corresponding to the directions 1 to 8 (802 to 809) in FIG. 8 and also shows priority of each color to create suitable atmosphere. By referring to the figure, it becomes possible to create suitable atmosphere. In addition, by preparing a plurality of candidate colors for the directions 1 to 8 (802 to 809) in FIG. 8, measures for dealing with the case where suitable atmosphere is not created are taken into consideration. It is suitable that such procedures should be put together, and, for example, they may be compiled in a database. For example, a database of illumination priority as shown in FIG. 10 may be used. Further, such data should preferably be recorded in the recording part 102. Directions are the directions 1 to 8 (802 to 809) in FIG. 8. In addition, Red 1002 shows illumination in red color and shows priority in each direction. The same applies to other colors (Orange 1003 to Brown 909). Furthermore, it is said that, in determining illumination color, colors impart changes in mind to human beings, and documents which describes relationship between colors and human mentality have been known. For example, refer to "Psychology of Colors, Takayoshi Kaneko, Iwanami Shinsho." Further, by rewriting the database, it is also possible to use different colors. It should be noted that these items to be stated in these database of illumination priority are not limited to those stated herein, but it shall be possible to delete or add them as required.

In FIG. 11, when suitable atmosphere is created, it is judged that creation of the atmosphere is successful, and it is preferable that priority of color should be enhanced through atmosphere control. For example, such successful creation may be compiled in a database. For example, the database of the number of successes as shown in FIG. 11 may be used. Further, such data should preferably be recorded in the recording part 102. Directions are the directions 1 to 8 (802 to 809) in FIG. 8. Furthermore, Red 1102 shows illumination in red color and shows the number of successes in each direction. The same applies to other colors (Orange 1103 to Brown 1109). It should be noted that these items to be stated in the database of the number of successes are not limited to those stated herein, but it shall be possible to delete or add them as required.

A method for rewriting atmosphere to suitable one is to rewrite the target areas 603 and 604 in the database of illumination of atmosphere (FIG. 6). However, since a change of only numeric figures is not receptive, it is preferable to make the change receptive by introducing GUI. FIG. 12 shows an example. In this example, if display 1201 is of a touch-panel type, setting can be made more intuitively by touching the panel with a finger. The reference number 1202 is a graph that illustrates an atmosphere space. First, area setup 1204 is selected, and then an area in which desirable atmosphere exists is set. It is preferable that the result thus set should be displayed on the display 1201, and area 1203 shows target space in the atmosphere space. Next, area environmental sound play 1205 is selected. Many types of voice according to atmospheres are recorded in advance in the recording part 102, and voice in the area that is selected by the area setup 1204 is reproduced. For this purpose, it is preferable that, as shown by an X mark 1207, site of the voice in the target space should be indicated. With such arrangement, it becomes easier to confirm that the sound contains suitable atmosphere. Finally, by selecting area save 1206, the target areas 603 and 604 in the database of illumination of atmosphere (FIG. 6) are rewritten to save the present settings. For this purpose, any other methods may be used if the GUI is designed for making setting operations more understandable. Further, even if the display 1201 is not of the touch-panel type, a device having different input part 103 may be used.

In the illumination determination flow chart in FIG. 9, a color of illumination was determined, but illumination color may be determined by using methods other than the process. In the above, illumination color was chosen in a direction from an area in atmosphere space to target space. This time, however, illumination color will be chosen by determining a color for an axis of atmosphere space. Since this method is same as the illumination determination flow chart in FIG. 9, description will be made based on the flow chart. Step "measurement" 902 is a process to measure the present atmosphere. As for processing method, either one of the areas 1 to 8 (708 to 7015) in the diagram that shows relationship between atmosphere and illumination is chosen according to a value that is calculated in the "analyzing atmosphere" 204. In the case of the target area 707, no choice is made. Then, a numerical number is increased by 1 for the item having the number that is chosen in Count 304 in the present status database (FIG. 3).

Step "color identification" 903 is a process to determine a color to be irradiated at present according to atmosphere based on the results of the measurement 902. With the process, the present atmosphere is determined, and if the atmosphere is not suitable, a process to identify a color which creates suitable atmosphere is carried out. First, the present atmosphere is determined. Actually, determination is made based on the result of counts, for a certain period of time, through atmosphere analysis of a speech calculated earlier. As for the determination method, a numerical figure of the item and the number of times for determining atmosphere 1409 in the database of illumination of atmosphere (FIG. 14) are compared, and if the value of the "count" 1304 exceeds the comparison result, the item should be the result. Then, an average is calculated based on a speech that is judged to be a value of the "count" 1304, and difference in direction and distance between the average and the target-center value is calculated for each axis. The results are stated in distance 1306 in the present status database (2) (FIG. 13). Next, a color for creating the atmospheres 1403 to 1406 in the database of illumination of atmosphere (FIG. 14) is chosen based on the distance to determine density of color to be irradiated based on the distance. For the determination, it is preferable that color density should be enhanced if the distance is long. For example, it is preferable to chose density that is adequate for the distance, by dividing the density into 10 levels in advance. Further, it is also preferable to introduce indices 1410 and 1411 which were calculated in the learning 904 and to multiply the distance calculated with the indices. In addition, a change is made in density this time, but is not limited to, and luminous intensity which indicates intensity of light may be used. Finally, a color to be irradiated is identified by combining a value that was calculated for each axis.

Step "learning" 904 is a process to confirm if the color obtained in color identification 903 actually made a difference when atmosphere conversion is carried out. A cause for not making a difference is that an adequate color is not irradiated. To deal with such problem, if creation of suitable atmosphere is not successful, values of indices 1401 and 1402 will be changed. First, determination is made based on the result of counts, for a certain period of time, through atmosphere analysis of a speech calculated earlier. As for the determination method, a numerical figure of the item and the number of times for changing luminous intensity 1409 in the database of illumination of atmosphere (FIG. 14) are compared, and if the value of the Count 1304 exceeds the comparison result, the item should be the result. Then, an average is calculated based on a speech that is judged to be a value of the Count 1304, and difference in direction and distance between the average and the target-center value is calculated for each axis. Then, by comparing the difference and the difference in distance that was previously calculated, 0.1 is reduced, for each axis, from the index if the value is too much, or 0.1 is added to the index if the value is insufficient. Using the results, indices 1410 and 111 in the present status database (2) (FIG. 13) are changed. With such arrangement, it is possible to make a modification to illumination that fits the space.

FIG. 13 shows a present status database (2) which is a partially modified version of the present status database shown in FIG. 3. Distance 1306 is used instead of the luminous intensity of illumination 306. Distance 1306 is a distance to the center of the target area according to active and pleasant indices.

For creating atmosphere, it is preferable that illumination should be utilized. For example, in this case, it is necessary that illuminations which can create atmosphere in the present space and atmosphere suitable to the space should be specified in advance, and a database of illumination of atmosphere shown in FIG. 14, wherein the illuminations are compiled, may be used. In this database, information that is required for creating atmosphere such as judgment criteria of illumination and intensity of illumination are stated. An attribute 601 is a description of an item that exists in the database. In a value 602, a value for each item of the attribute 601 is described. In the box of illumination for enhancing activity 1403, a color for enhancing activity is described. In the box of illumination for enhancing non-activity 1404, a color for enhancing non-activity is described. In the box of illumination for enhancing pleasantness 1405, a color for enhancing pleasantness is described. In the box of illumination for enhancing unpleasantness 1406, a color for enhancing unpleasantness is described. Target areas 1407 and 1408 show converted values of atmosphere that is suitable for the space. The values are calculated by "analyzing atmosphere" 204 by using voice data that is judged to be suitable in the space. Number of times for determining atmosphere 1409 is an item that will be the base for determining the present atmosphere, wherein criteria for determining atmosphere are described. Based on the result, atmosphere that should be created is determined. Indices 1410 and 1411 are values for indicating indices of luminous intensity or color for each axis. Finally, it is preferable that customization should be enabled by rewriting the database of illumination of atmosphere (2) (FIG. 14).

FIG. 15 is a schematic diagram illustrating relationship between atmosphere and illumination. FIG. 15 shows activeness 703 and non-activeness 704, and pleasantness 705 and unpleasantness 706 in two-dimensional graphs as is the case with FIG. 7. In FIG. 15, an area of suitable atmosphere in space, wherein an event shows activeness 703 and non-activeness 704, and another event shows pleasant 705 and unpleasant 706, is shown as a target area 1503, which illustrates target areas 1407 and 1408 in the database of illumination of atmosphere (2) (FIG. 14). The arrangement of dividing the area for increment and decrement is divided into eight areas is same as shown in FIG. 7. In FIG. 15, results of atmosphere analysis for each speech are denoted as an X mark 1501, and the results exist within area 6. The reference number 1502 shows an average in the area. Lines 1505 and 1504 show directions of the average 1502 and the direction of the center of the target area 1503 according to axis. Colors and density to be irradiated will be changed according to distance of 1505 and 1504.

As stated above, with the first embodiment, atmosphere in space is created by irradiating illumination. Since direct appealing to human sensibility by using illumination is possible, atmosphere can be controlled without being recognized by a person. In addition, for controlling atmosphere, it is preferable to create atmosphere that is suitable to the site, and, with the embodiment, it is possible to detect many atmospheres only by changing parameters for creating standard atmosphere.

Further, in space, atmosphere. that is suitable to the space exists. With the embodiment, to keep the atmosphere suitable to the space, atmosphere analysis is executed from time to time based on voice and difference of atmosphere between the present atmosphere and the atmosphere suitable to the space is calculated. Then, illumination that can create atmosphere suitable to space is chosen and irradiated.

Second Embodiment

The first embodiment was a conversion device of atmosphere in narrow public space, wherein relationship between a microphone and illumination is one to one. The second embodiment aims at a conversion device of atmosphere in wider public space, wherein atmosphere conversion is carried out by using a plurality of lighting apparatuses for a plurality of microphones. In this case, it is preferable that atmosphere of the entire public space should not be changed, but atmosphere conversion should be executed for local space in which a certain atmosphere is detected. For this purpose, therefore, atmosphere of local space in public space will be controlled. When a plurality of devices for analyzing atmosphere 1610 exist, another device to control these devices for analyzing atmosphere is required, and such device is referred to as a device for changing atmosphere control 1620.

Further, since the devices for analyzing atmosphere 1610 and the device for changing atmosphere control 1620 are connected with a communication network 1630 and a network used, the device for changing atmosphere control 1620 is not required to be installed in the same space. Therefore, by installing the device for changing atmosphere control 1620 in a room where a public space manager is stationed, it is possible to use the device for changing atmosphere control 1620 for monitoring the present atmosphere status in public space.

Furthermore, many units of the device for changing atmosphere control 1620 can be installed in a room, which makes it possible to monitor atmosphere over the entire room.

Further, with the second embodiment, since the device for changing atmosphere control 1620 is used as a sensor for determining atmosphere based on voice and atmosphere analysis is executed over the entire space, it can be used as a sensor network. In this case, the devices for analyzing atmosphere 1610 will play the role of sensor nodes and the device for changing atmosphere control 1620 plays the role of a server. It is possible to provide the devices for analyzing atmosphere 1610 only with a voice input function, but transferring of sound data to the device for changing atmosphere control 1620 may result in a load to the network. Therefore, with the devices for analyzing atmosphere 1610, it is arranged to transfer only analysis results to the device for changing atmosphere control 1620 by executing a voice input function and an atmosphere analysis function, which contributes to realize smaller data amount and applies no load to the network.

Since description of the second embodiment will be made based on atmosphere conversion using the atmosphere control device 100 shown in the first embodiment, description of parts which overlap with those in the first embodiment will be omitted.

FIG. 16 is a system configuration diagram for realizing the atmosphere control device according to the present invention in the second embodiment. The device for analyzing atmosphere in FIG. 16 includes a control part 1611 which has various communication functions, a data processing function and so on, a recording part 1612 capable of storing various types of data such as a hard disk and a memory, an operation input part 1612 which enables inputting through a keyboard, a mouse, a touch panel, a remote control unit, etc., an output part 1614 which includes a liquid crystal display, a loudspeaker, etc. and enables display of various types of data and outputting of voice, a communication part 1615 which executes wireless communication or wired communication for communicating with the device for changing atmosphere control 1620 via the communication network 1630, and a voice input part 1616 which has a microphone for inputting voice in surrounding areas. In addition, in the recording part 1612, the main program and the like for executing various processes in the devices for analyzing atmosphere 1610 are recorded, and the main program is read by the control part 1611 for execution of various processes. The devices for analyzing atmosphere 1610 are devices to output the present atmosphere by analyzing sound that is taken in from the voice input part 1616.

Further, the device for changing atmosphere control 1620 includes a control part 1621 which has various communication functions, a data processing function and illumination changing function and so on, a recording part 1622 which enables recording of various types of data such as a hard disk, a memory device, etc., an operation input part 1623 which enables inputting through a keyboard, a mouse, a touch panel, a remote control unit, etc., an output part 1624 which includes a liquid crystal display, a loudspeaker, etc. and enables display of various types of data and outputting of voice, a communication part 1625 which executes wireless communication or wired communication for communicating with the devices for analyzing surrounding voice 1610 via the communication network 1630, and an illumination part 1626 which has a function to irradiate illumination into space. Further, in the recording part 1622, the main program for executing various processes in the device for changing atmosphere control 1620 are recorded, and the main program is read by the control part 1621 for execution of various processes. The device for changing atmosphere control 1620 is a device to irradiate illumination for creating suitable atmosphere toward a certain atmosphere.

With the first embodiment, atmosphere was obtained by the atmosphere control device 100. With the second embodiment, however, the atmosphere control device 100 is further divided into the device for analyzing atmosphere 1610 which executes processes for obtaining atmosphere based on voice and the device for changing atmosphere control 1620 which controls the device for analyzing atmosphere 1610. Actually, Step "taking in" 2102 to Step "renewing present database" 2105 of the flow chart (FIG. 21) for "making device for analyzing atmosphere a request of analyzing", which indicates processing procedures of the device for analyzing atmosphere 1610 fall into Step "taking-in" 203 to Step "renewing present database" 205 of the flow chart (FIG. 2) of the atmosphere control device in the first embodiment.

Next, FIG. 17 shows a configuration example of the case of a plurality of atmosphere control devices in which the above-stated device for analyzing atmosphere 1610 and the device for changing atmosphere control 1620. FIG. 17 is a configuration diagram for the case of a plurality of devices for analyzing atmosphere. The configuration includes a plurality of devices for analyzing atmosphere to 1704 and a device for changing atmosphere control which controls the devices for analyzing atmosphere to 1704. Further, the devices for analyzing atmosphere 1702 to 1704 and the device for changing atmosphere control 1701 are connected via a network.

The devices for analyzing atmosphere 1702 to 1704 take in voice through a microphone and analyze atmosphere in the space based on voice. The analysis result is sent to the device for changing atmosphere control 1701, wherein the present status of atmosphere that is sent from the devices for analyzing atmosphere 1702 to 1704 is analyzed for controlling information. If atmosphere that is not suitable to the space, illumination for creating suitable atmosphere is chosen and the illumination is irradiated into the space. In this case, it will be arranged that a plurality of illumination parts are installed in a dispersed manner, an adequate illumination part is chosen according to a site where illumination is required to be controlled, and the illumination output is controlled. Information on sites of a plurality of devices for analyzing atmosphere (voice input part) and sites of a plurality of illumination parts are stored in the recording part of the device for changing atmosphere control. Alternatively, instead of site of each device, associating relationship between a plurality of devices for analyzing atmosphere (voice input part) and a plurality of illumination parts may be stored in the recording part.

With the device for changing atmosphere control 1620, it is preferable that control of a plurality of devices for analyzing atmosphere 1610 and control of illumination should be performed. For example, FIG. 18 is an example of this, and it is preferable that a flow chart of another device for changing atmosphere control which is in adherence with the spirit of the present invention should be used. Start 1801 shows the starting point of atmosphere control processing. Once the processing is implemented, the steps from "judgment of close" 1802 to "changing illumination" 1806 will be repeated until it is judged closed in Step "judgment of close" 1802. In "judgment of close" 1802, it is judged if the atmosphere control processing is closed or not by checking whether a command for closure that is sent from the input part 1623 has been received or not. If the atmosphere control processing is continuing, the step advances to the step "making device for analyzing atmosphere a request of analyzing", or if it is closed, the step advances to "close" 1807. Further, in the step "making device for analyzing atmosphere a request of analyzing" 1803, a request for analysis on present status is transmitted to the device for analyzing atmosphere 1610, and the device for analyzing atmosphere 1610 receives the present status. Further, in the step "making device for analyzing atmosphere a request of analyzing", information on the status of the device for analyzing atmosphere 1610 such as starting-up status of the device for analyzing atmosphere 1610 is transmitted to the device for changing atmosphere control 1620 in addition to analysis result of voice in the surrounding areas. Thus, it becomes possible to control the device for analyzing atmosphere 1610 by using the device for changing atmosphere control 1620. In the step "renewing database of control" 1804, the database for controlling device for analyzing atmosphere (FIG. 19) is renewed based on the result received by the "making device for analyzing atmosphere 1610 a request of analyzing" 1803. In "renewing database of illumination" 1805, the database for controlling illumination (FIG. 20), which is a database for controlling illumination that enables creation of atmosphere presently suitable in the space, is renewed based on the database for controlling device for analyzing atmosphere (FIG. 19). In "changing illumination" 1806, the present illumination is replaced according to the illumination change command based on the database for controlling illumination (FIG. 20). Further, when changing illumination, it is preferable that the change should be carried out without being noticed by a person concerned as much as possible, and an example of this is to make a change gradually by taking time. The step "close" 1807 shows the closing point of the flow chart of the device for changing atmosphere control (FIG. 18).

With the device for changing atmosphere control 1620, it is preferable that status of a plurality of devices for analyzing atmosphere 1610 should be controlled. For example, the database for controlling device for analyzing sound in surrounding areas shown in FIG. 19, which compiles the status, may be used. This is a database in which data sent from the devices for analyzing atmosphere 1610 is recorded and the data is recorded in the recording part 1622. A device for analyzing atmosphere ID 1901 is an independent number that is assigned to each of a plurality of devices for analyzing atmosphere 1610. Based on the information, it is preferable to identify a site where illumination should be irradiated. A site 1902 is a site where the devices for analyzing atmosphere 1610 exist at present. Based on the information, it is preferable to identify a site where illumination should be irradiated. Present conditions 1903 show the present statuses of the devices for analyzing atmosphere 1610. The conditions include statuses of action and stop, and the status of action indicates the status that atmosphere analysis is in process and the status of stop indicates the status that atmosphere analysis is not in process. Illumination 1904 shows the result of atmosphere analysis executed by each of the devices for analyzing atmosphere 1610. Luminous intensity of illumination 1905 shows intensity of illumination light for creating atmosphere. Result concerning luminous intensity of illumination is indicated according to each of the devices for analyzing atmosphere 1610. This indicates intensity of illumination light that creates atmosphere. The values include large, middle and small values, and it is arranged that luminous intensity will increase as the value increases. Judging time 1906 indicates time when atmosphere analysis is executed by each of the devices for analyzing atmosphere 1610.

With the device for changing atmosphere control 1620, it is preferable that illumination should be controlled. For example, the database for controlling illumination (FIG. 20), which compiles statuses of illumination in a database, may be used. The database for controlling illumination is a database in which statuses of illumination that are controlled by the device for changing atmosphere control 1620 are recorded, and the database is recorded in the recording part 1622. Illumination ID 2001 is a number that is unique to an illumination apparatus. The device for analyzing atmosphere ID 2002 is a number of the device for analyzing atmosphere 1610 which led to change of illumination. Illumination 2003 shows required illumination to be irradiated for creating atmosphere in space. This is same as the illumination 1904 in the database for controlling device for analyzing atmosphere (FIG. 19). Luminous intensity of illumination 2004 is the luminous intensity when illumination is irradiated. This is same as the luminous intensity of illumination 1905 in the database for controlling device for analyzing atmosphere (FIG. 19). Judging time 205 is time when judgment is conducted. Elapsed time 2006 is time that has elapsed since illumination changed.

In the step "making device for analyzing atmosphere a request of analyzing" 1803, voice is analyzed by the device for analyzing atmosphere 1610, the result of which is then delivered to the device for changing atmosphere control 1620 for changing illumination. In such case, it is preferable to indicate procedures taken by the device for analyzing atmosphere 1610 and the device for changing atmosphere control 1620. For example, FIG. 21 is an example of this, and it is preferable that a flow chart of another device for making a request of analyzing atmosphere which is in adherence with the spirit of the present invention should be used. It should be noted that, since the processes from "taking in" 2102 through "renewing present database" 2105 will be omitted here, since they are same as those from "taking in" 203 through "renewing present database" 206 of the flow chart of the atmosphere control device. Start 2101 implies the staring point of processes in the device for analyzing atmosphere. In communications 1606, a value calculated by the step "renewing present database" 2105 is transmitted to the device for changing atmosphere control 1620. Closed 2107 shows the end of the flow chart of the step "making device for analyzing atmosphere a request of analyzing" (FIG. 21).

As described in the above, the second embodiment enables atmosphere conversion with several illumination apparatuses for many microphones, by using a plurality of devices for analyzing atmosphere and a device for changing atmosphere control which controls the devices for analyzing atmosphere, and thus atmosphere conversion in wider space can be realized.

INDUSTRIAL APPLICABILITY

Since the present invention enables to flexibly control atmosphere, it can be utilized for creating atmosphere in desired space such as restaurants including a bar. Further, since the present invention can control a plurality of microphones and illumination in a lump sum, it can be utilized for monitoring in various types of space such as for detecting a riot.

BRIEF DESCRIPTION OF THE DRAWINGS

FIG. 3 illustrates a database showing the present status of the atmosphere control device that is used in the first embodiment.

FIG. 6 illustrates a database concerning atmosphere illumination.

FIG. 11 illustrates a database showing if creation of atmosphere suitable for a color has been successful.

FIG. 13 illustrates a database (No. 2) showing the present status of the atmosphere control device to be used in the first embodiment.

FIG. 14 illustrates a database (No. 2) concerning atmosphere illumination.

FIG. 18 illustrates processes and a flow chart thereof of a device for changing atmosphere control that is used in the second embodiment.

FIG. 19 illustrates a database showing the present status of a device for analyzing atmosphere that is used for processes in the device for changing atmosphere control used in the second embodiment.

FIG. 20 illustrates a database showing the present status of illumination used for processes in the device for changing atmosphere control used in the second embodiment.

Explanation of Reference Numbers

Figure 1:
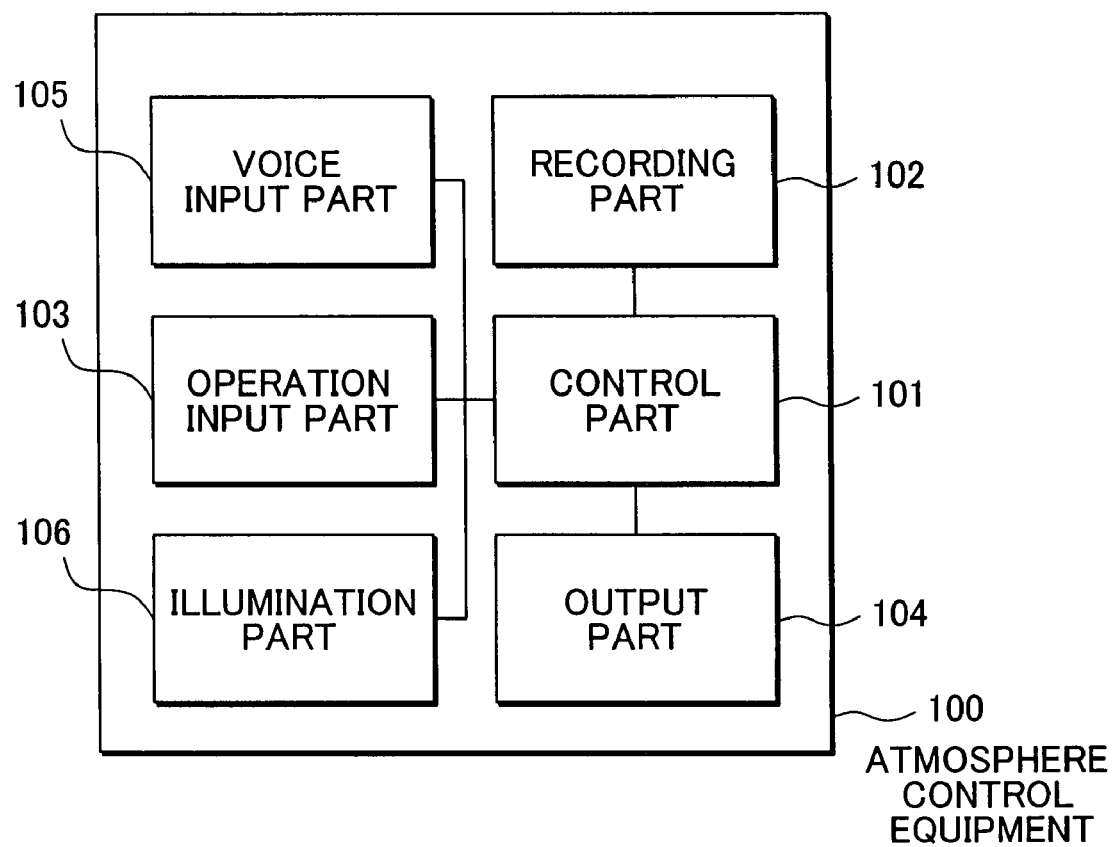
FIG. 1 illustrates a system configuration diagram for realizing an atmosphere control device according to the present invention.
Figure 2:
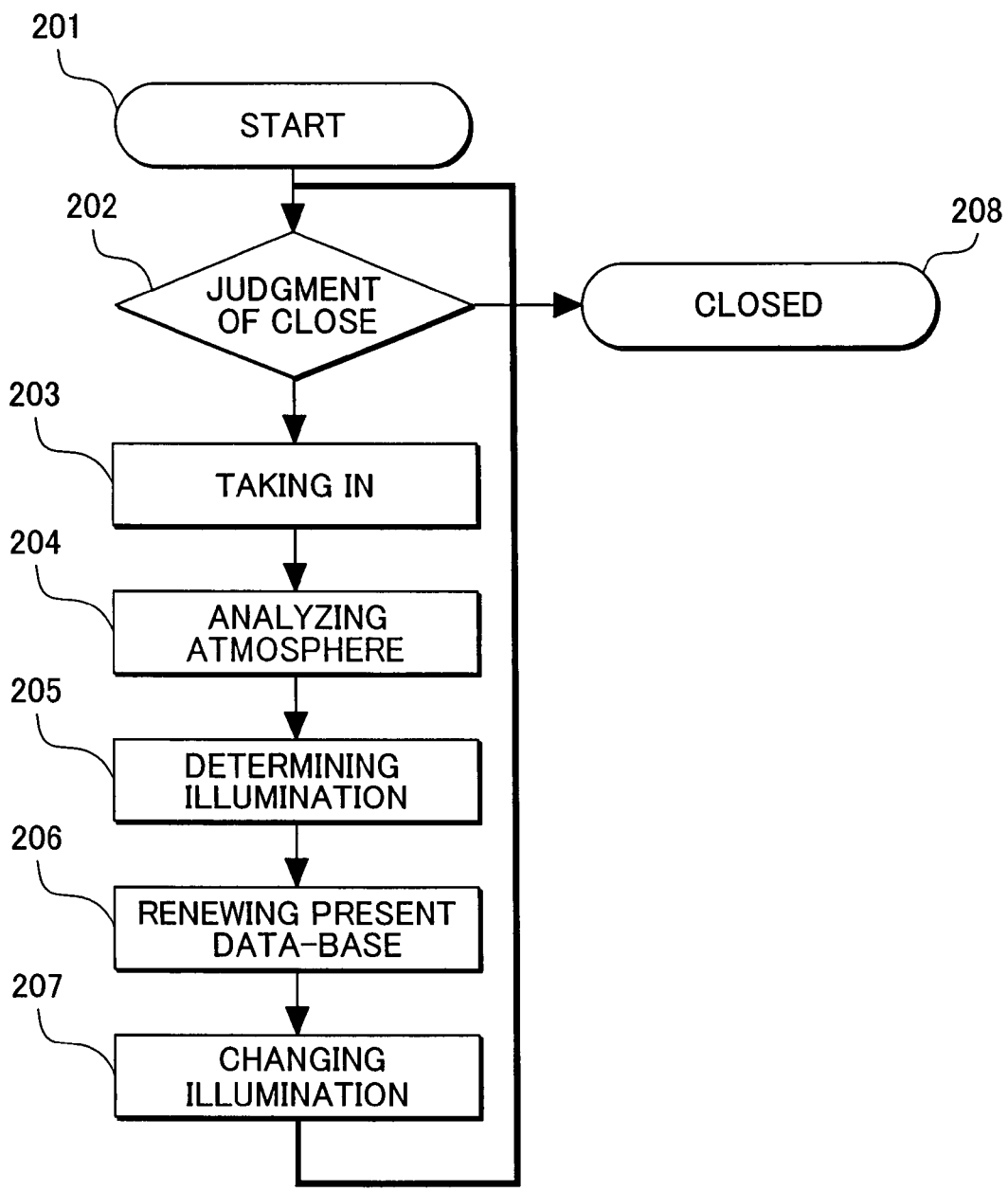
FIG. 2 illustrates processes and a flow chart thereof of the atmosphere control device that is used in a first embodiment of the present invention.
Figures 4, 5:
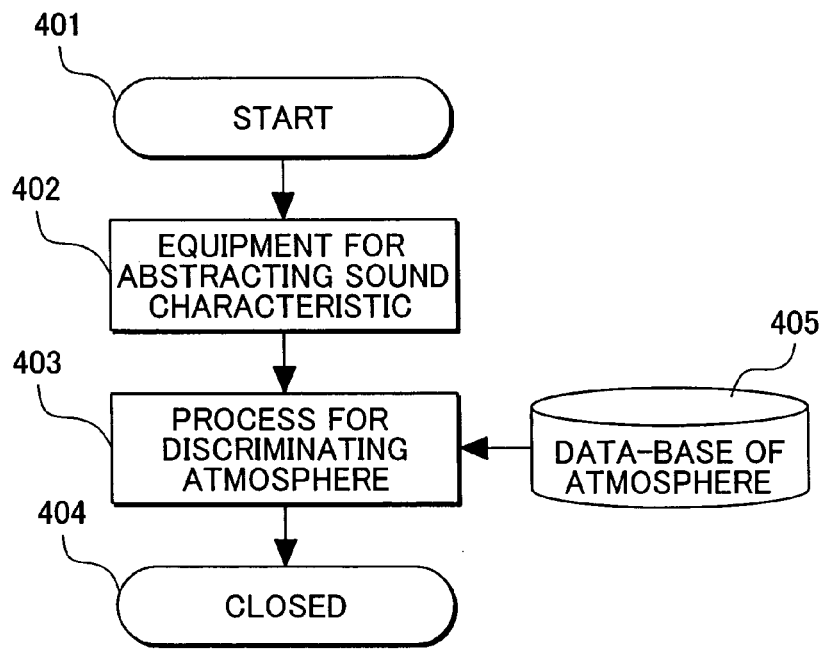
FIG. 4 illustrates processes of atmosphere analysis and a flow chart thereof.
FIG. 5 illustrates a database in which reference atmosphere that is used in atmosphere analysis processes is stored.
Figure 7:
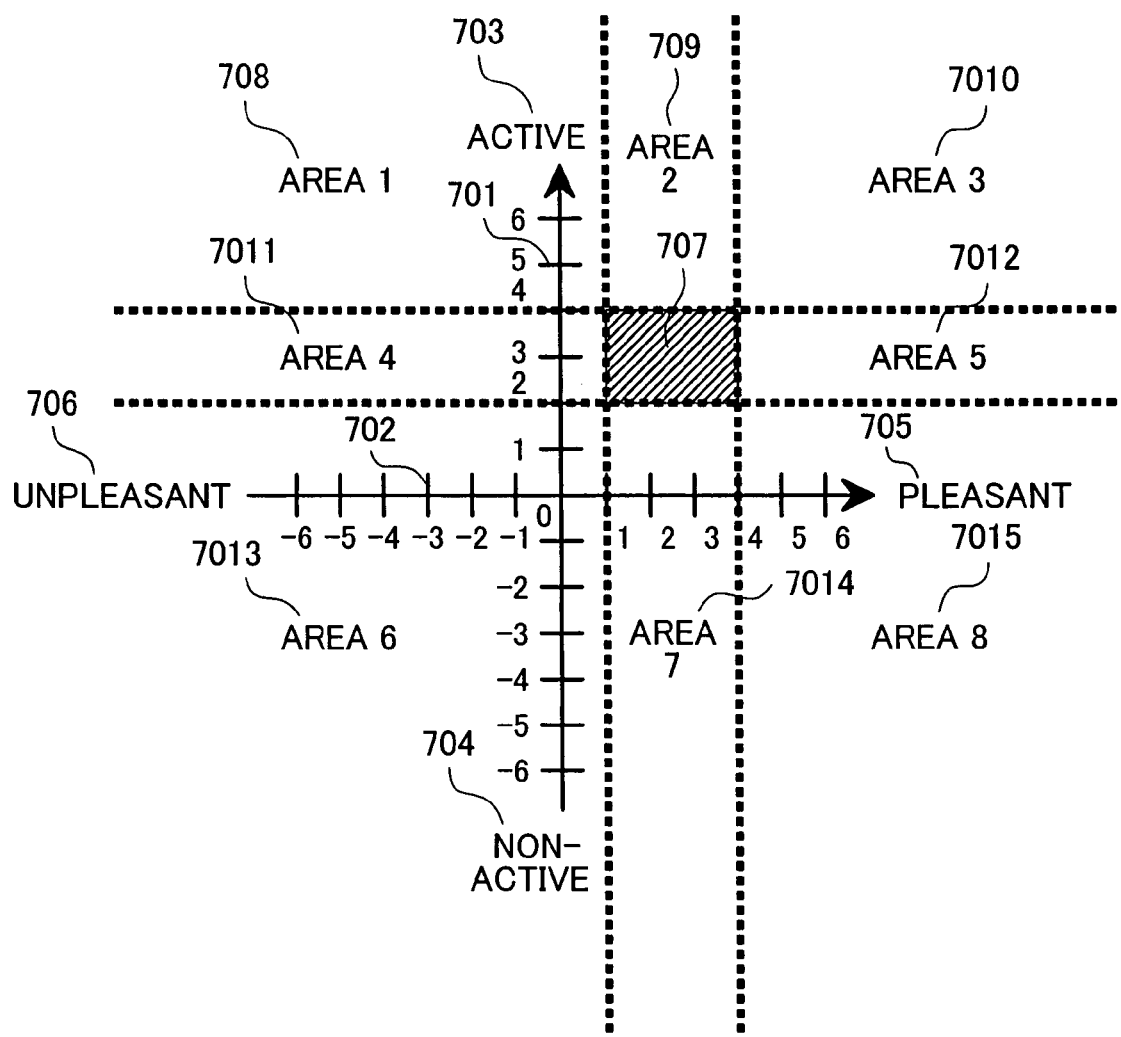
FIG. 7 is a diagram illustrating relationship between atmosphere and illumination.
Figure 8:
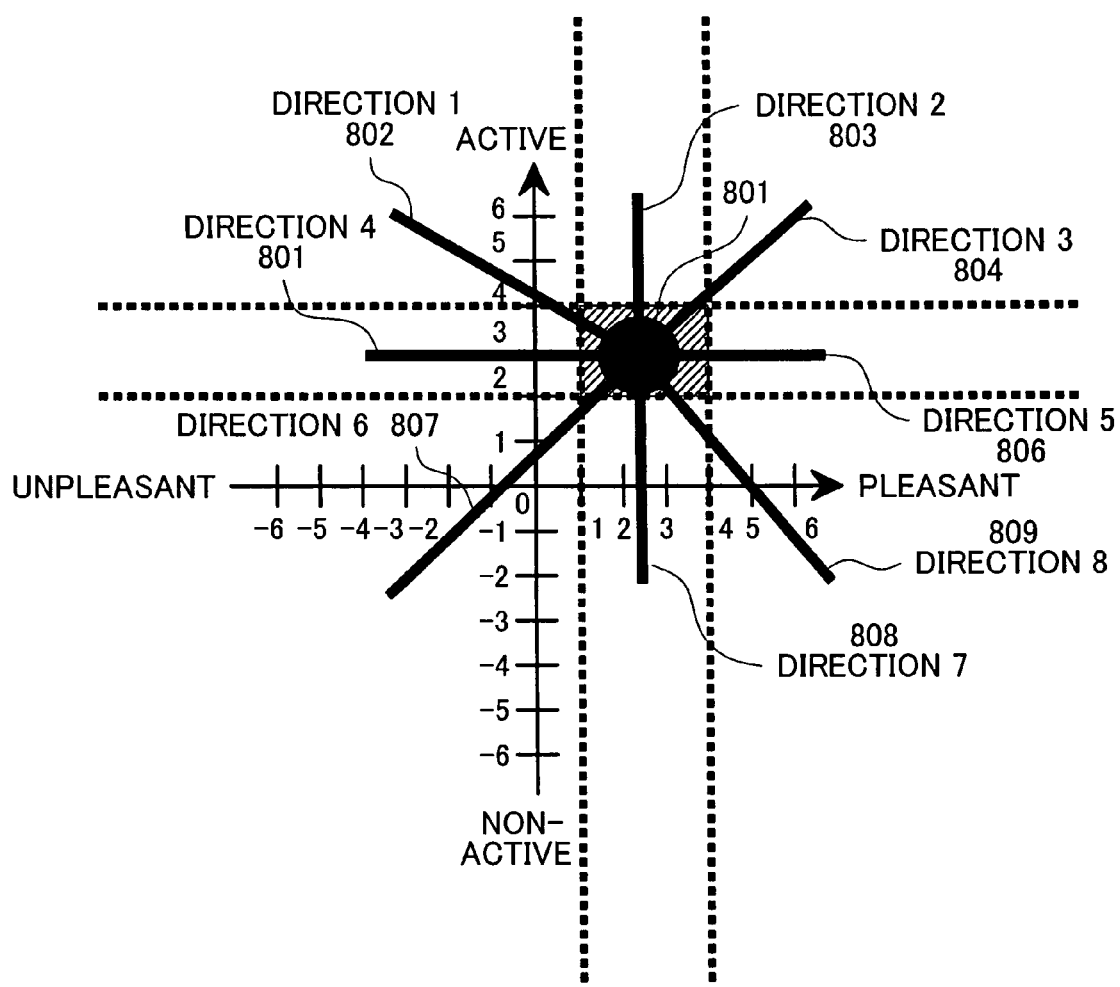
FIG. 8 is a diagram illustrating directions for creating suitable atmosphere.
Figures 9, 10:
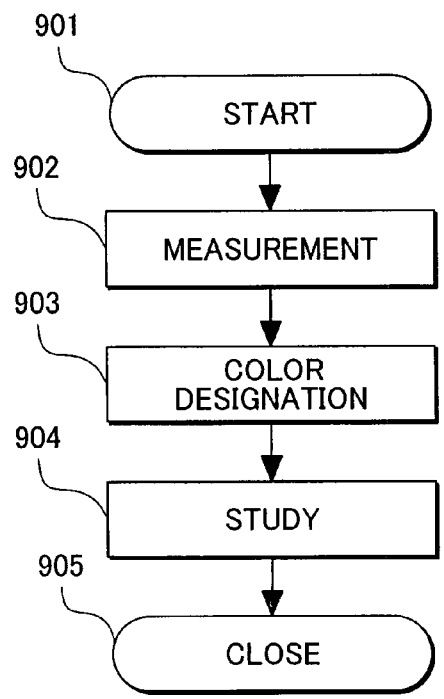
FIG. 9 illustrates processes for determining color of illumination and a flow chart thereof.
FIG. 10 illustrates a database showing priority of colors to be used for illumination.
Figure 12:
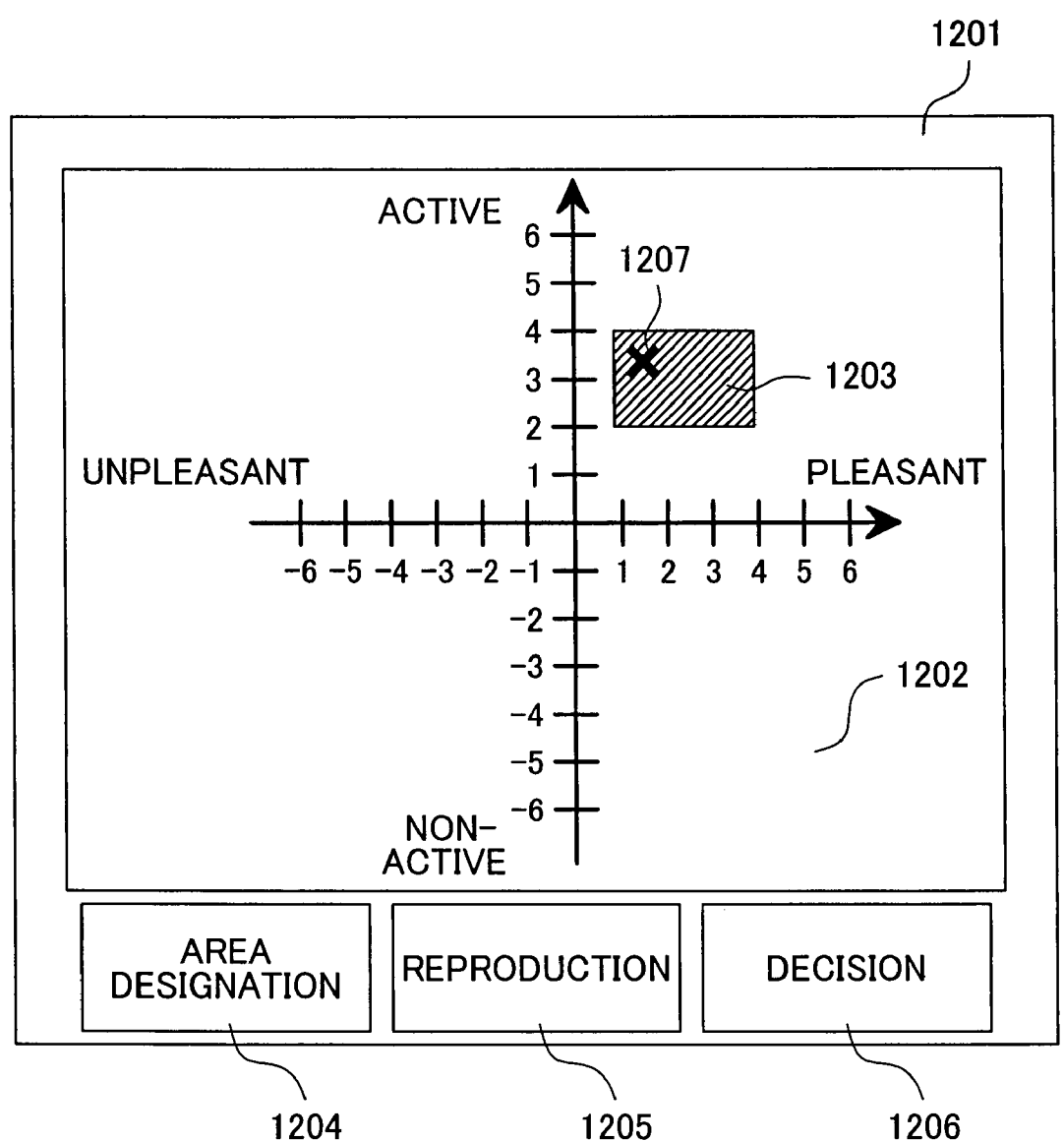
FIG. 12 is a diagram illustrating a window for changing atmosphere.
Figure 15:
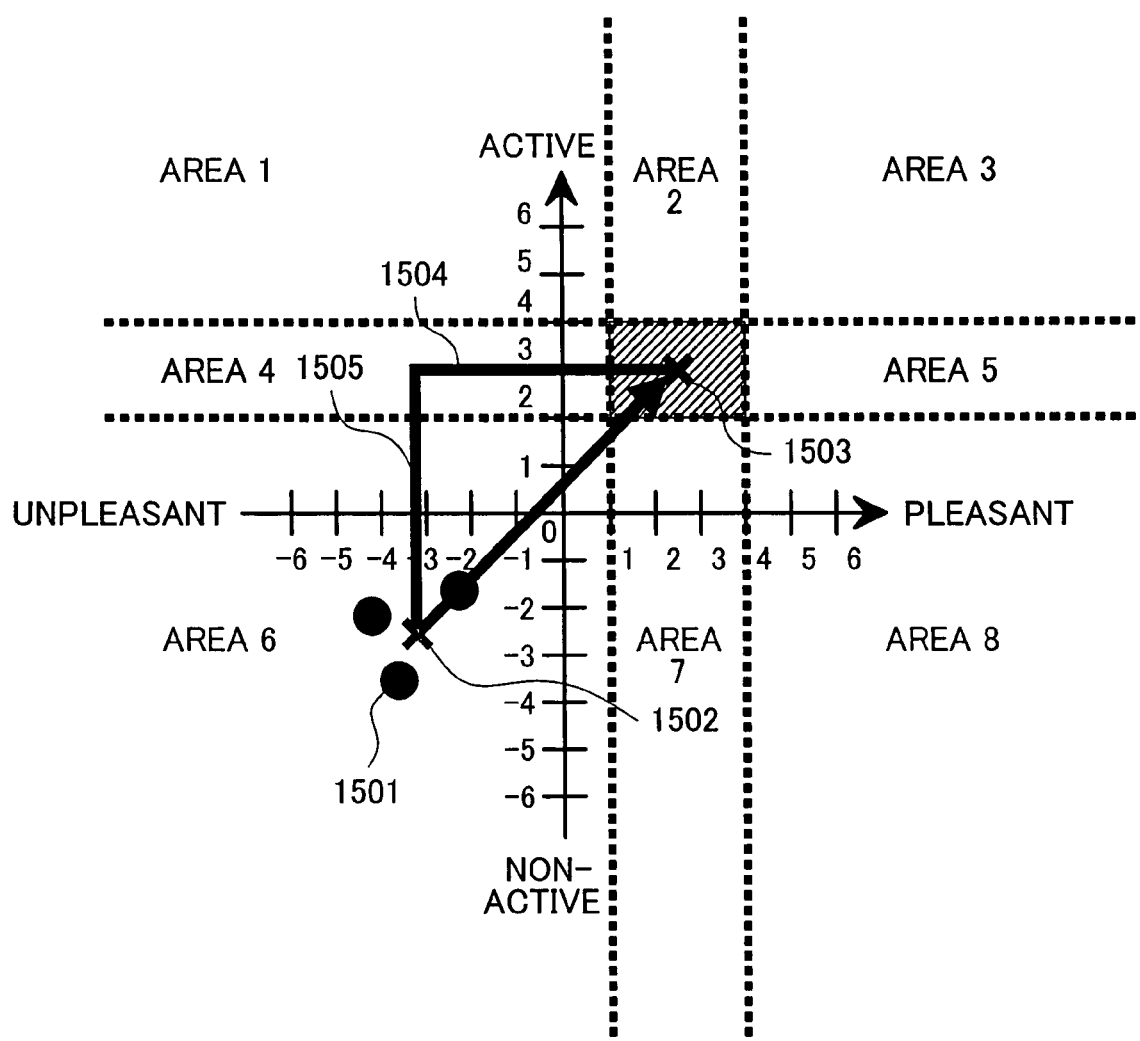
FIG. 15 is a diagram (No. 2) showing relationship between atmosphere and illumination.
Figure 16:
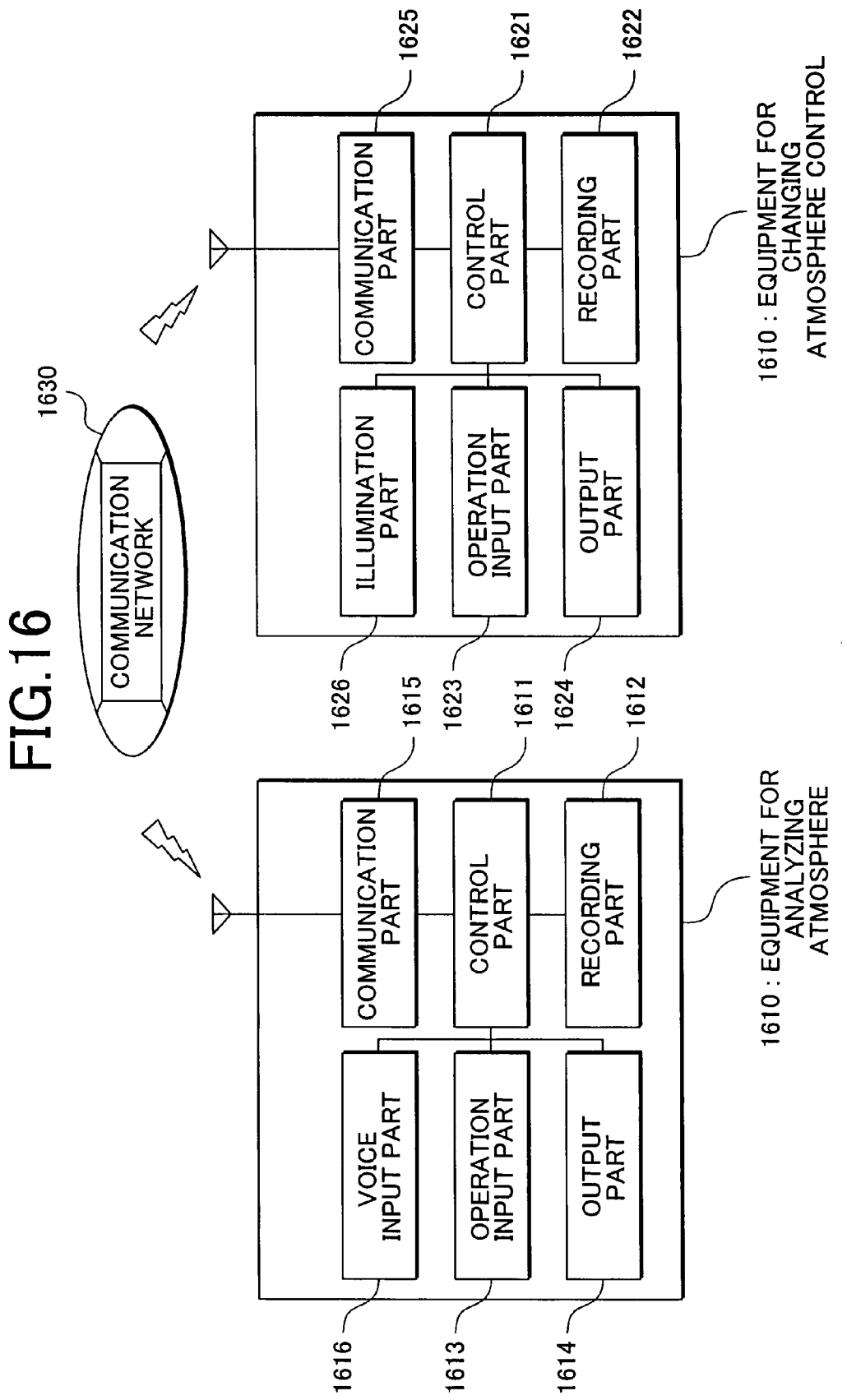
FIG. 16 is a system configuration diagram for realizing an atmosphere control device in the case where the device for analyzing atmosphere and the device for changing atmosphere control to be used in the second embodiment are used.
Figure 17:
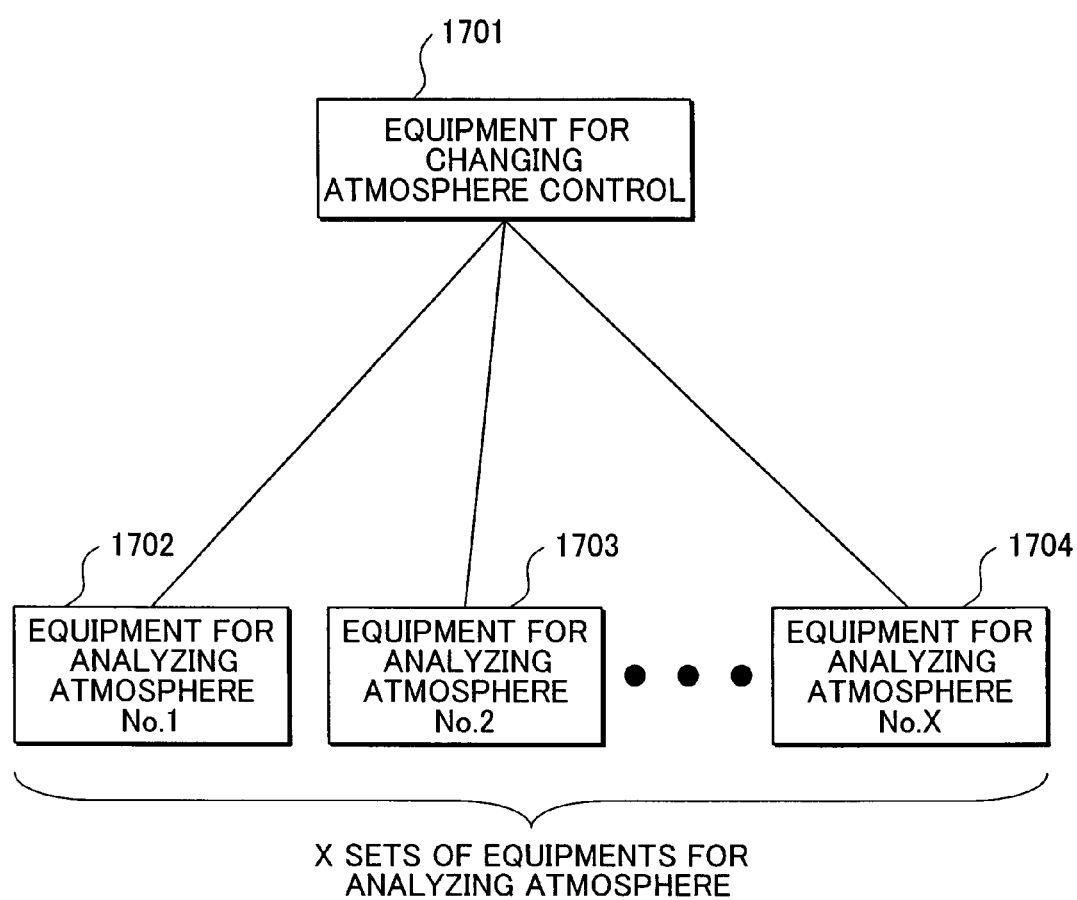
FIG. 17 is a configuration diagram in the case where a plurality of devices for analyzing atmosphere and a device for changing atmosphere control that are used in the second embodiment are used.
Figure 21:
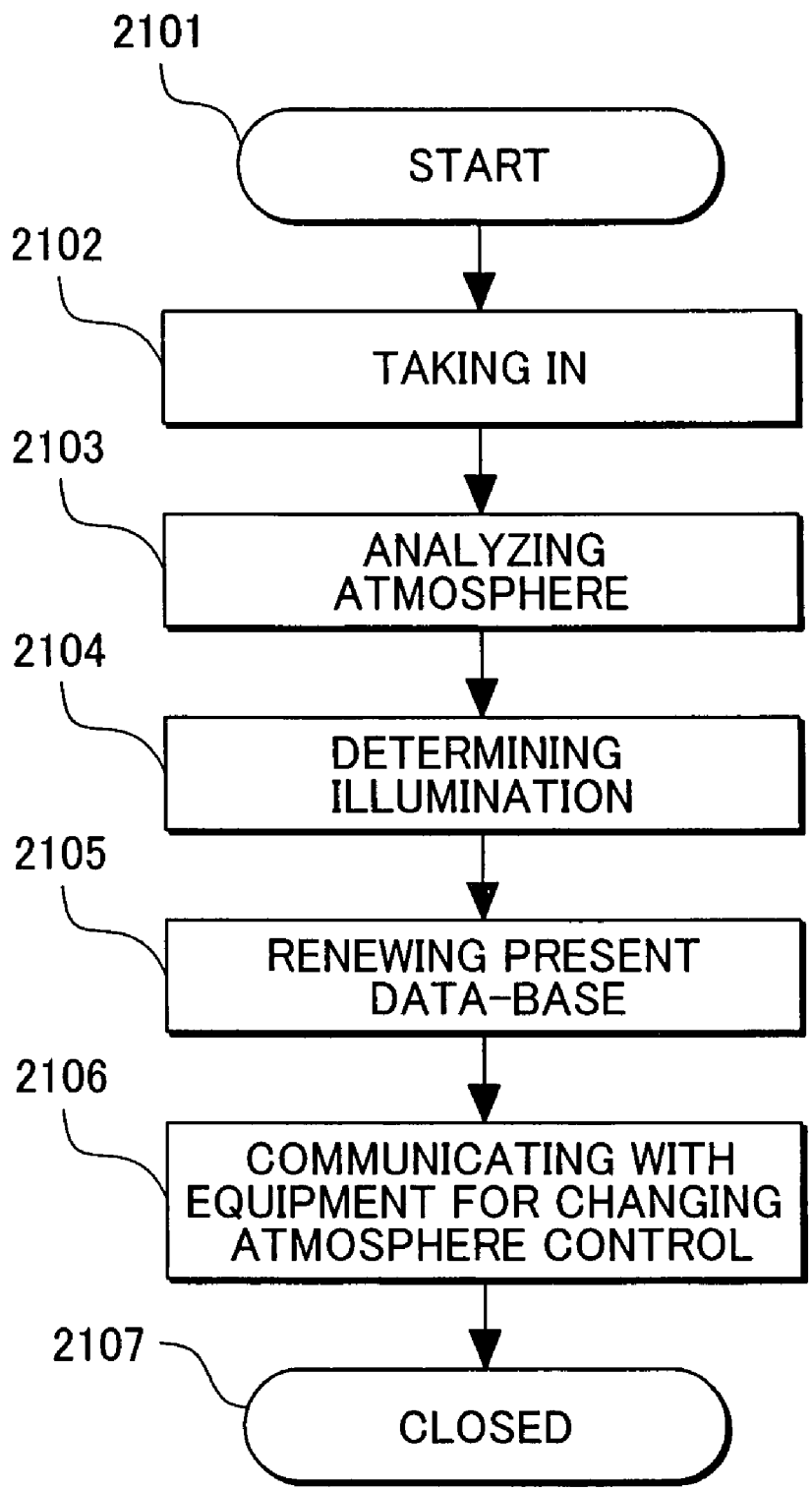
FIG. 21 illustrates processes and a flow chart thereof of a device for analyzing atmosphere used in the second embodiment.

100: Atmosphere control device
1610: Device for analyzing atmosphere
1620: Device for changing atmosphere control
1630: Communication network

The invention claimed is:

1. An atmosphere control device comprising:
a voice input part that accepts voice input;
a recording part that records atmosphere attribute information and atmosphere change information;
an illumination part that changes illumination output according to desired atmosphere; and
a control part,
wherein the control part executes analysis of the present atmosphere based on voice from the voice input part, calculates a difference between a parameter of desired atmosphere that is stored in the atmosphere attribute information and a parameter indicating the present atmosphere, determines a control parameter of said illumination part by referring to the atmosphere change information, said atmosphere change information including information about a relationship between a change in the illumination output and a change in the atmosphere attribute information, and controls an illumination output of the illumination part by using the control parameter and controls the present atmosphere into a desired atmosphere.

2. The atmosphere control device according to claim 1, wherein in the atmosphere change information, color information of illumination is stored in association with the difference between the parameters of the atmospheres.

3. The atmosphere control device according to claim 1, wherein in the atmosphere change information, a method for irradiating illumination is stored in association with the difference of the parameters of the atmospheres.

4. The atmosphere control device according to claim 1, comprising an operation input part that inputs user operations, wherein the control part changes a parameter of desired atmosphere which is to be stored in the atmosphere attribute information based on the user input.

5. The atmosphere control device according to claim 1, wherein the control part analyzes atmosphere based on voice that is input after the illumination is controlled and evaluates outcome of the control based on the analysis.

6. The atmosphere control device according to claim 1, wherein the control part determines a control parameter to be output to the illumination part according to the outcome of the control based on past control and to the atmosphere change information.

7. The atmosphere control device according to claim 1 comprising a plurality of voice input parts and a plurality of illumination parts, wherein
the recording part records information showing association of the plurality of voice input parts and the plurality of illumination parts, and
the control part analyzes the present atmosphere for each of the voice input parts, calculates a control parameter based on difference between the parameter of the present atmosphere and the parameter of the desired atmosphere, searches in the recording part an illumination part that corresponds to a voice input part to which voice that caused the control parameter is input, and outputs the control parameter to the associating illumination part.

8. A method for controlling atmosphere by use of an atmosphere control device that includes a voice input part, a recording part that records atmosphere attribute information and atmosphere change information, and an illumination part that changes illumination output according to desired atmosphere, the method comprising:
a first step of accepting input of voice in surrounding areas in the voice input part;
a second step of executing analysis of the present atmosphere based on the voice input in the control part;
a third step of calculating a difference between a parameter of desired atmosphere that is stored in the atmosphere attribute information and a parameter indicating the present atmosphere;
a fourth step of determining a control parameter of the illumination part by referring to the atmosphere change information, said atmosphere change information including information about a relationship between a change in the illumination output and a change in the atmosphere attribute information; and a fifth step of controlling illumination output of the illumination part by using the control parameter and controlling the present atmosphere into a desired atmosphere.

9. The method for controlling atmosphere according to claim 8, comprising:

a sixth step of, in the control part, analyzing atmosphere based on voice that is input after the illumination is controlled and evaluating outcome of the control based on the analysis, wherein in the fourth step, a control parameter to be output to the illumination part is determined based on the outcome of control based on past control and the atmosphere change information.

10. The method for controlling atmosphere according to claim 8, wherein the atmosphere control device includes the plurality of voice input parts and the plurality of illumination parts, records information that indicates association between the plurality of voice input parts and the plurality of illumination parts in the recording part, executes the second to fifth steps for each of the voice input parts in the control part, searches an illumination part that corresponds to a voice input part to which voice that caused the control parameter is input, and outputs the control parameter to the associating illumination part.

* * * * *